No. 615,237. Patented Dec. 6, 1898.
C. F. BALSER.
ATTACHMENT FOR BICYCLES.
(Application filed Feb. 26, 1898.)
(No Model.) 2 Sheets—Sheet 1.
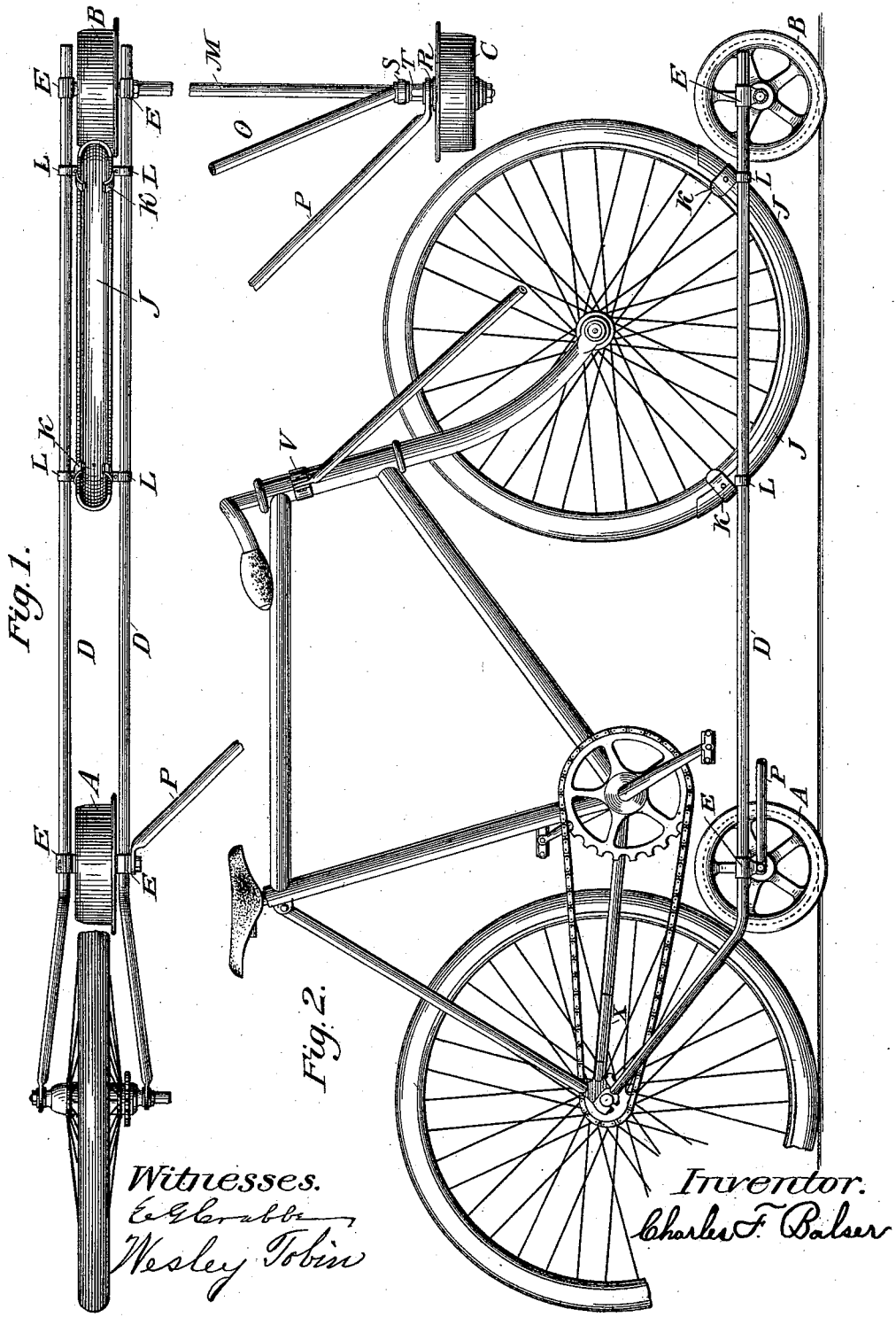
Witnesses.
Inventor.
Charles F. Balser No. 615,237. Patented Dec. 6, 1898.
C. F. BALSER.
ATTACHMENT FOR BICYCLES.
(Application filed Feb. 26, 1898.)
(No Model.) 2 Sheets—Sheet 2.
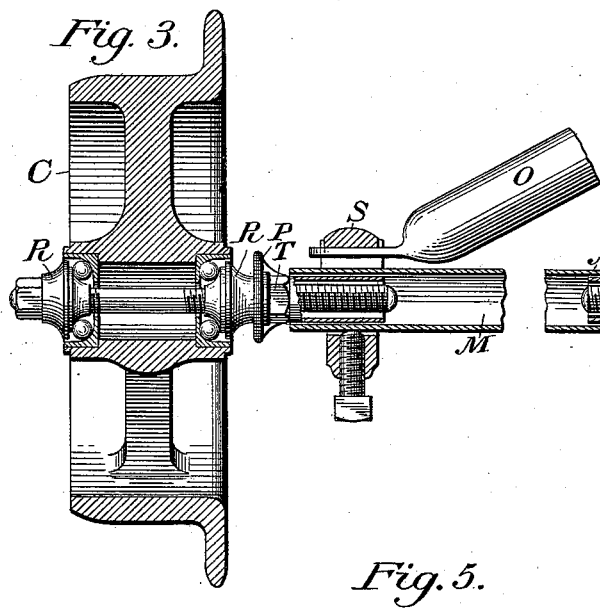
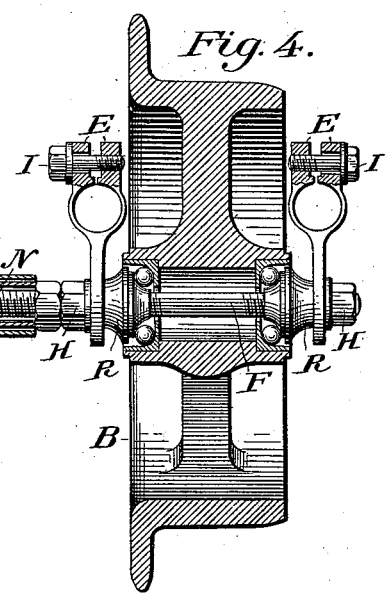
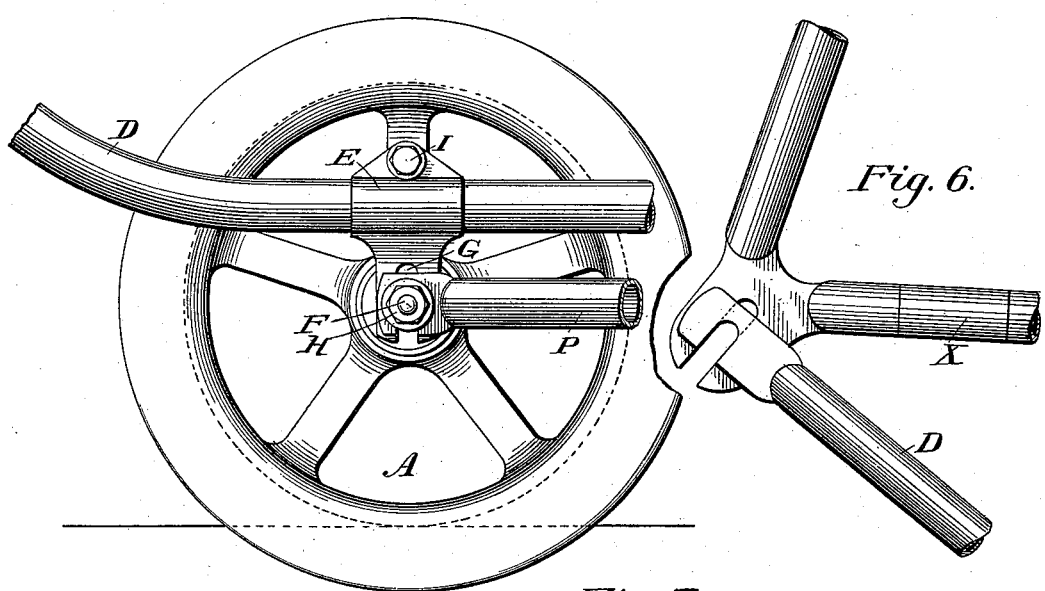
Witnesses.
Inventor:
Charles F. Balser.

UNITED STATES PATENT OFFICE.

CHARLES F. BALSER, OF SPRINGFIELD, ILLINOIS.

ATTACHMENT FOR BICYCLES.

SPECIFICATION forming part of Letters Patent No. 615,237, dated December 6, 1898.

Application filed February 26, 1898. Serial No. 671,824. (No model.)

*To all whom it may concern:*

Be it known that I, CHARLES F. BALSER, a citizen of the United States, residing at Springfield, in the county of Sangamon and State of Illinois, have invented certain new and useful Improvements in Attachments for Bicycles, of which the following is a specification.

This invention relates to bicycle attachments, the object of which is to provide a simple, reliable, and easily-transportable device which when applied to that class of bicycles known as "safeties" adapts them for travel on railroad-tracks.

A further object is to provide an inexpensive attachment of durable construction that may be easily adjusted to any safety-bicycle and as readily separated therefrom and folded for ready transportation.

To accomplish these ends my invention consists of certain features of construction and combination of parts, which will be hereinafter described and claimed.

Reference is to be had to the accompanying drawings, forming part of this specification, in which similar letters refer to and indicate corresponding parts in all the views.

Figure 1 is a plan view. Fig. 2 is a side elevation of a bicycle, showing the relation of parts of attachment and means of securing them thereto. Fig. 3 is an enlarged sectional view of outer flanged wheel and shows its connection with the braces M O P. Fig. 4 shows a similar view of wheel B, its bearings and axle and their connection with the clamps E and tube M. In Fig. 5 a side elevation is shown of the flanged wheel A and the means of securing the rear end of the diagonal brace-tube P. Fig. 6 is a side elevation showing the rear end of one of the tubes D and their relation or position to the rear forks of bicycle. Fig. 7 is a vertical sectional view of the clamp S, which binds or secures the outward ends of braces M, O, and P.

Placed on opposite sides of the bicycle-wheels are the tubes or rods D D and which form the frame or connection for the single flanged wheels A and B and also support the receptacle J. The rods D are secured at the rear ends against the rear forks of the bicycle by the nuts on rear axle. These ends are flattened and slotted, as shown, Fig. 6; but I do not limit myself to this construction, as the same end could be attained by clamping the ends against the lower rear forks along the section marked X. Extending from this fastening the tubes D are bent and formed downward and inward toward each other and extend beyond the front wheel of bicycle.

Adjustable longitudinally on the tubes or rods D are the four clamps E, which are shown in section in Fig. 4 and a side elevation in Fig. 5.

The axles F of small flanged wheels A and B are adjustable vertically in the slots G, as shown in Fig. 5, and are secured and supported against the clamps E by the cones R R and nuts H H.

The four clamps E are secured to the rods D D and held in their proper vertical positions by the screws I, as shown in Figs. 4 and 5.

The rear bicycle-wheel rests directly on the rail, while the forward bicycle-wheel rests in the curved receptacle or shield J clear of the track. The two flat curved springs K serve to hold the tire securely and keep the bicycle-wheel in the shield J, Figs. 1 and 2.

The cylindrical portion of the nut N, as shown, (sectional view, Fig. 4,) is brazed securely and permanently in the end of tube M. The said nut N screws on the axle F of wheel B against the nut H, and thus forms the inner support of the traverse tube M.

Wheel C, fitted with ball-bearings, rests on the rail directly opposite the wheel B and supports the outward ends of braces M, O, and P, as shown in Figs. 1 and 3. The outward end of the traverse tube or brace M passes freely over the cylindrical portion of nut T, thus forming the outward support and connection with the axle of wheel C. The forward and outward end of tube P is flattened and perforated, through which perforation passes the axle of wheel C, and the nut T serves to bind the end against the cone R securely. Tube P is projected horizontally and diagonally backward from this fastening and secured at its opposite end against the clamp E by the nut H, as shown in Fig. 5.

Clamp S (sectional view shown in Fig. 7) serves to bind together the outward ends of tubes M and O to the nut T, from which connection brace O is projected upward and inclined backward at an angle to a suitable point at head of bicycle, where it is adjustable but securely fastened by the clamp V. (Shown in Fig. 2.)

The four clamps L are adjustable longitudinally on the rods D D and serve to hold the shield or receptacle J centrally and securely between them and sufficiently raised to clear the rail.

Having thus described my invention, I claim as new and desire to secure by Letters Patent—

1. In the combination of an attachment with a bicycle, the two longitudinal rods or braces, secured at their upper and rear ends, at the rear axle, to the rear forks of the bicycle-frame, converging downward and extending forward on opposite sides of the bicycle-wheels, forming a parallel and horizontal frame.

2. In an attachment for bicycles the four clamps E, having lugs or projections with slots G forming a housing and allowing of vertical adjustment for the axles of small flanged wheels; secured adjustably longitudinally on the horizontal portion of the frame, consisting of two longitudinal rods or braces; secured at their upper and rear ends to the rear forks of a bicycle-frame, converging downward and extending forward on opposite sides of the bicycle-wheels.

3. In the combination of an attachment, with a bicycle, two longitudinal rods or braces secured at their upper and rear ends, at the rear axle, to the rear forks of the bicycle-frame, converging downward and extending forward on opposite sides of the bicycle-wheels, forming a parallel and horizontal frame, secured thereon, an adjustable receptacle or pocket, adapted to secure and suspend the front wheel of a bicycle substantially as described.

CHARLES F. BALSER.

Witnesses:
E. G. CRABBE,
WESLEY TOBIN.